United States Patent [19]

Penzias

[11] Patent Number: 5,475,738
[45] Date of Patent: Dec. 12, 1995

[54] INTERFACE BETWEEN TEXT AND VOICE MESSAGING SYSTEMS

[75] Inventor: Arno A. Penzias, Highland Park, N.J.

[73] Assignee: AT&T Corp., Murray Hill, N.J.

[21] Appl. No.: 140,901

[22] Filed: Oct. 21, 1993

[51] Int. Cl.⁶ .................................................. H04M 1/64
[52] U.S. Cl. ................................. 379/67; 379/88
[58] Field of Search ................................. 379/67, 88, 89, 379/100

[56] References Cited

U.S. PATENT DOCUMENTS

| | | | |
|---|---|---|---|
| 4,837,798 | 6/1986 | Cohen et al. | 379/88 |
| 5,127,047 | 6/1992 | Bell et al. | 379/93 X |
| 5,138,653 | 8/1992 | Le Clercq | 379/375 X |

FOREIGN PATENT DOCUMENTS

| | | |
|---|---|---|
| 5-37556 | 2/1993 | Japan . |
| 5327762 | 12/1993 | Japan . |

OTHER PUBLICATIONS

Audio Messaging Interchange Specification (AMIS) Analog Protocol, Version 1 Issue 2 Feb. 1992.
"Methodology for Creating and Distributing Audio Messages" IBM Technical Disclosure Bulletin vol. 36 No. 09B Sep. 1993.

*Primary Examiner*—Jeffery A. Hofsass
*Assistant Examiner*—Daniel Hunter
*Attorney, Agent, or Firm*—Kenneth M. Brown

[57] ABSTRACT

A method and apparatus for generating a voice message based on a text message from a text messaging system is disclosed. The voice message stored in a voice messaging system or may be directly transmitted to a recipient telephone number. The text messaging system comprises one or more addressable nodes including a messaging system interface node, which receives the text message from the text messaging system based on its node address and generates a voice message responsive to the text message. Signals may be generated to access the voice messaging system, and the voice message may be communicated to the voice messaging system for storage. The voice message may comprise speech corresponding to the text of the text message, created, for example, by conventional text-to-speech synthesis techniques. The text message may also be communicated to a text message addressee with use of the text messaging system, and the voice message may comprise speech reflecting that a text message has been so communicated.

23 Claims, 2 Drawing Sheets

INTERFACE BETWEEN TEXT AND VOICE MESSAGING SYSTEMS

FIELD OF THE INVENTION

The present invention relates generally to automated messaging systems and specifically to the interconnection of computer-based text messaging systems and telecommunications-based voice messaging systems.

BACKGROUND OF THE INVENTION

Automated messaging systems have enjoyed widespread use in recent years. These systems provide a convenient and direct way of communicating a message to an individual, such as, for example, an individual who may not be immediately available to receive the message. In the field of telephone communications, for example, voice messaging systems allow a calling party to leave an audio message for a called party who is not presently available to receive a telephone call. Such systems vary in complexity from automatic telephone answering machines, typically employed in the home, to sophisticated voice messaging systems commonly connected with large PBX systems, such as the American Telephone and Telegraph Company's (AT&T's) DEFINITY® PBX system. Examples of the latter type include AT&T's AUDIX® voice messaging system for institutions and businesses.

Simple voice messaging systems are activated when a called party fails to answer a telephone call. These systems typically record the voice message directly on conventional audio tape. In more sophisticated systems, the voice message may be conveyed into digital data for storage in computer memory and then converted back into voice signals upon retrieval by the message recipient. Sophisticated systems may also provide for direct message recording, without first requiring that the party to whom the message is directed fail to answer a telephone call.

In the field of computer-based communication, text messaging systems allow one computer system user to send text messages to another user. These systems are commonly referred to as electronic mail, or "e-mail," systems. E-mail systems are commonly available on large computer systems (e.g., mainframes) which are shared by a number of users connected to the system by remote terminals, and on computers which are interconnected to other computers in a "network." Such computer networks include LANs (Local Area Networks) and WANs (Wide Area Networks), as well as otherwise independent computer systems interconnected through conventional telephone lines with the use of modems. In each of these cases, multiple users in different locations (i.e., different offices, different buildings, or even different cities or countries) are electronically interconnected enabling electronic communication of textual messages. Examples of electronic mail systems provided on a widespread (i.e., national or international) networked basis include, for example, American Telephone and Telegraph Company's AT&T MAIL system.

These two types of messaging systems have been generally regarded as distinct means of communication. In many instances, however, a potential recipient of a message has access to both text and voice messaging systems or services. Consequently, one who desires to communicate with such a recipient using automated messaging has a choice of providing the recipient with a text message, a voice message, or both. Since the sender of a message often does not know which automated system will be most effective in delivering the message (since, e.g., the sender may not know which system the recipient will check first or how often such checking will be done), the sender often finds it desirable to send the same message twice—once using each system. In doing this, the sender may commit himself or herself to a time consuming effort to provide duplicate messages. Thus, it would be advantageous if the sender could send the same message by both means simultaneously, without having to first type a message to an e-mail system and then having to repeat the message verbally to a voice messaging system.

SUMMARY OF THE INVENTION

The present invention provides a technique for generating a voice message responsive to a text message from a text messaging system. The voice message may be communicated to a voice messaging system for storage thereon, or it may be transmitted over a telephone line directly to an individual. The text messaging system comprises one or more addressable nodes including a messaging system interface node. Illustratively, the messaging system interface node receives the text message from the text messaging system based on the node's text messaging system address. The node generates a voice message responsive to the text message. Signals are generated by the interface node to access a voice messaging system, and the voice message is communicated to the voice messaging system for storage.

According to one illustrative embodiment, the access signals are telephone access signals, and the voice message is transmitted to the voice messaging system over a telephone network. The voice message comprises speech signals corresponding to the text of the text message. These speech signals are created, for example, by conventional text-to-speech synthesis techniques.

According to another illustrative embodiment, the text message is additionally communicated to a text message addressee with use of the text messaging system. In this embodiment, the voice message comprises, for example, speech reflecting that a text message has been so communicated.

In accordance with another illustrative embodiment of the present invention, the voice messaging system address of a voice message addressee is determined based on a text messaging system address. For example, a voice messaging system address which corresponds to the text messaging system address may be retrieved from a database. The voice messaging system address may comprise a telephone number and/or a telephone extension.

In accordance with yet another illustrative embodiment of the present invention, a recipient telephone number of an individual to which the voice message is directly transmitted is determined based on a text messaging system address. For example, a recipient telephone number which corresponds to the text messaging system address may be retrieved from a database.

DETAILED DESCRIPTION

Illustrative System for Storing Voice Messages

Figure 1:
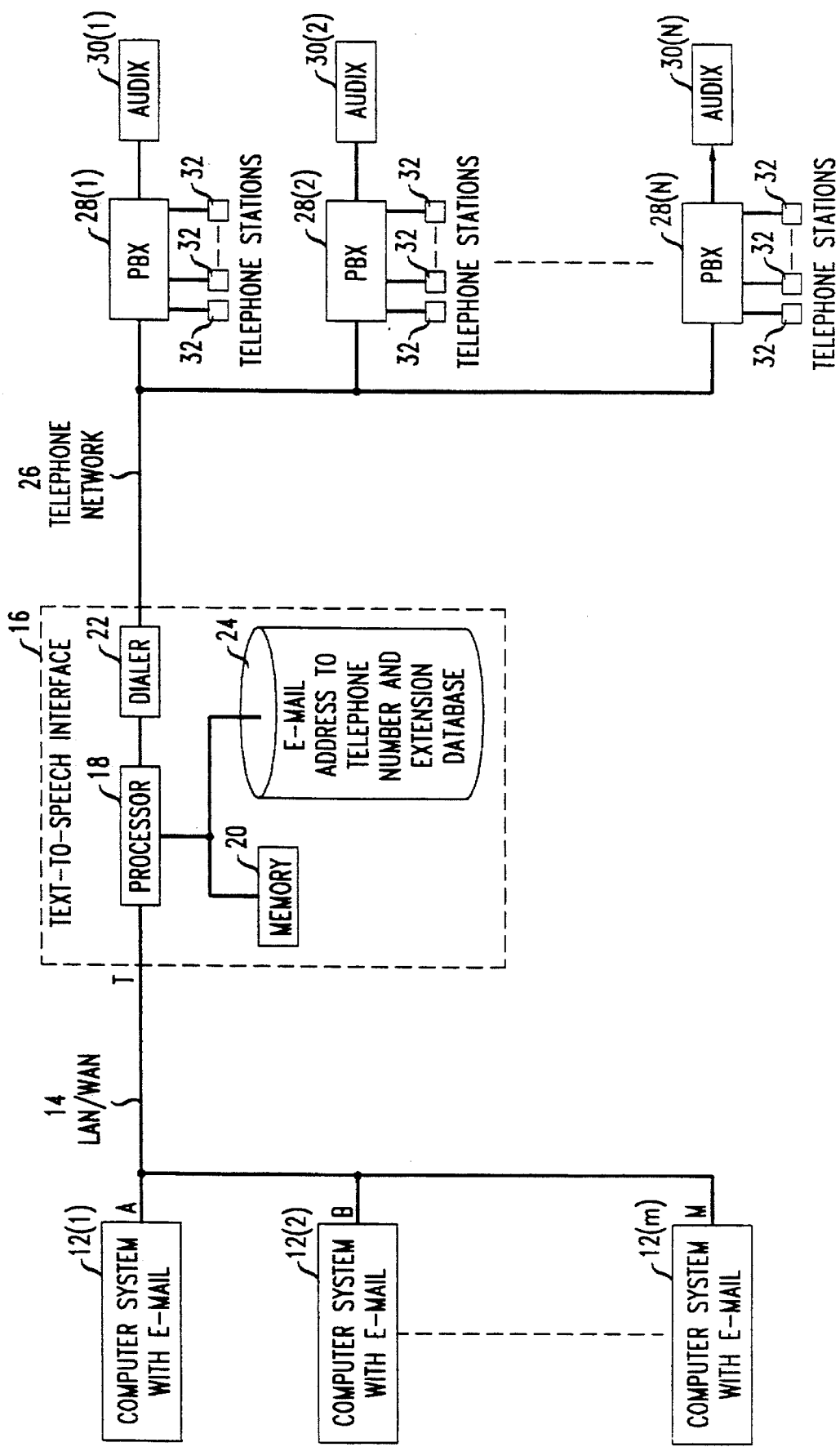
FIG. 1 shows a block diagram of a system for storing a voice message responsive to a text message in a voice messaging system in accordance with an illustrative embodiment of the present invention.

FIG. 1 shows a block diagram of an illustrative embodiment of the present invention. The illustrated system generates a voice message based on a text message from a text messaging system, and stores the generated voice message in a voice messaging system. A plurality of computer systems 12(1), 12(2), . . . 12(M) (hereafter 12) which include text messaging (i.e., e-mail) capability are interconnected by a conventional network 14. (While a plurality of systems 12 are illustrated, only one such system is required for purposes of the present invention.) E-mail may be provided by a conventional e-mail software process running on each computer system. Network 14, as illustrated, may be either a Local Area Network (LAN) or a Wide Area Network (WAN). In other embodiments, however, systems with text messaging capability may be interconnected by telephone networks (i.e., the public switched telephone network with modem interfaces) or by other conventional means for computer system communication. Each of the computer systems 12 may be either an individual "workstation" associated with a single user or a larger system (e.g., a mainframe) shared by a plurality of users. Each computer system 12 connected to network 14 is referred to as a "node."

Each computer system e-mail user will commonly have a "mailbox" which resides on his or her computer system. Typically, the mailbox is a portion of memory (or a mass storage device) which is available to hold text messages which have been sent through the e-mail system by other users. Each computer system on the network has a unique network address for use by the e-mail system. For example, the system illustrated in FIG. 1 shows that the e-mail address of computer system 12(1) is "A," the address of computer system 12(2) is "B," and the address of system 12(M) is "M." In this manner, each text message may be sent to an intended recipient by routing the message through the address of the node which includes the intended recipient as a user (i.e., the node on which the intended recipient's mailbox resides). When a node receives an e-mail message, the message is stored in the recipient's mailbox.

In accordance with the illustrated embodiment of the present invention, text-to-speech (TTS) interface 16, having a unique network address, "T", is also connected to network 14. TTS interface 16 serves as an interface between the text and voice messaging systems, and is referred to herein as a "messaging system interface." TTS interface 16 receives a text message from the e-mail system and converts it to a voice message. TTS interface 16 also generates access signals as required for storing the generated voice message in a voice messaging system. Moreover, TTS interface 16 may also serve as one of computer systems 12, and one or more users may have a mailbox residing on it.

The network address of TTS interface 16 may be known a priori to the e-mail processes residing on each computer system 12 (i.e., the address may be a fixed node name); it may be specified by the user who initiates the message; or, it may be determined based on other criteria, such as, for example, an e-mail address of a particular e-mail addressee (see discussion of alternative embodiments, below)

TTS interface 16 comprises processor 18, memory 20, dialer 22 and database 24. Processor 18 may be a conventional, general purpose CPU (central processing unit) or a conventional, dedicated processor such as a DSP (digital signal processor) such as the AT&T DSP16 or DSP32C. Memory 20 may comprise conventional storage devices such as RAM (random-access-memory), ROM (mad-only-memory), and/or mass storage devices such as a magnetic disk or tape mass storage device.

Memory 20 is used to store the software operating routines for processor 18. For example, conventional text-to-speech conversion software for converting the text message to a voice message is stored in memory 20. In addition, software which generates voice messaging system access signals to control the storage of the voice message in the voice messaging system is stored in memory 20. Memory 20 may also be used for temporary data storage. For example, a voice message generated by TTS interface 16 based on a text message may be stored temporarily in this memory pending its transmission over the telephone network to a voice messaging system.

Dialer 22 comprises conventional circuitry as employed, for example, by modems used to interconnect a computer system to a telephone line. Dialer 22 is used to place outgoing calls and to transmit and receive signals over the telephone network.

Database 24 provides an illustrative mechanism for determining a voice messaging system "address" to which the generated audio voice message may be sent. Database "lookup" software routines may be provided in memory 20. Processor 18 uses these routines to retrieve the voice messaging system address from database 24, based, for example, on a text messaging system address of a particular addressee of the text message.

The e-mail system sends a text message to an individual e-mail addressee (i.e., a particular user of a computer system 12), as well as to TTS interface 16. That is, an e-mail user may send a conventional e-mail message to an e-mail addressee, further requesting that the message also be delivered to TTS interface 16 for conversion to a voice message. Either the sender's node, the recipient's node, or an intermediate node through which the message passes may recognize the request, duplicate the message, and send it to the additional destination—namely, to TTS interface 16.

When such a message arrives, TTS interface 16 determines a voice messaging system address which corresponds to the text messaging system address of the e-mail addressee to which the text message was (conventionally) sent. This determination is made, for example, by a database lookup. In this manner, the same message may be sent in both text and voice form to the same individual—the text message to his or her e-mail address and the voice message to his or her voice messaging system address.

Database 24 comprises telephone numbers at which voice messages are stored for particular individuals, and these telephone numbers are retrieved from the database based on those individuals' e-mail addresses. The stored telephone numbers may, for example, reflect telephone lines which are connected to conventional telephone answering machines. Alternatively, and in accordance with the illustrative embodiment presented here and in the discussion of FIG. 2, below, each individual has both a telephone number and a telephone extension stored in database 24. The telephone number reflects the number to be dialed to reach the individual's voice messaging service (e.g., the AUDIX system connected to a particular PBX system), while the extension is used to identify the individual to the voice messaging service. (Typically, the extension of an AUDIX user is equivalent to that user's account number and thereby serves to identify the user.) Thus, a telephone number and a telephone extension combine to form each individual's voice messaging system "address."

Conventional telephone network 26 serves as a communications network coupling the text and voice messaging systems. Specifically, TTS interface 16 is connected by dialer 22 to a conventional phone line, thereby providing access to telephone network 26. The block diagram of FIG. 1 further illustrates the connection of one or more conventional PBX systems 28(1), 28(2), . . . 28(N) (hereafter 28) to telephone network 26. These PBX systems are coupled to voice messaging systems (e.g., AUDIX) which receive and store voice messages for message recipients. Each AUDIX voice messaging system 30(1), 30(2), . . . 30(N) (hereafter 30) is connected to a corresponding PBX system 28. In addition, each PBX system has connected to it a corresponding plurality of conventional telephone stations 32.

Illustrative Operation of the System of FIG. 1

Figure 2:
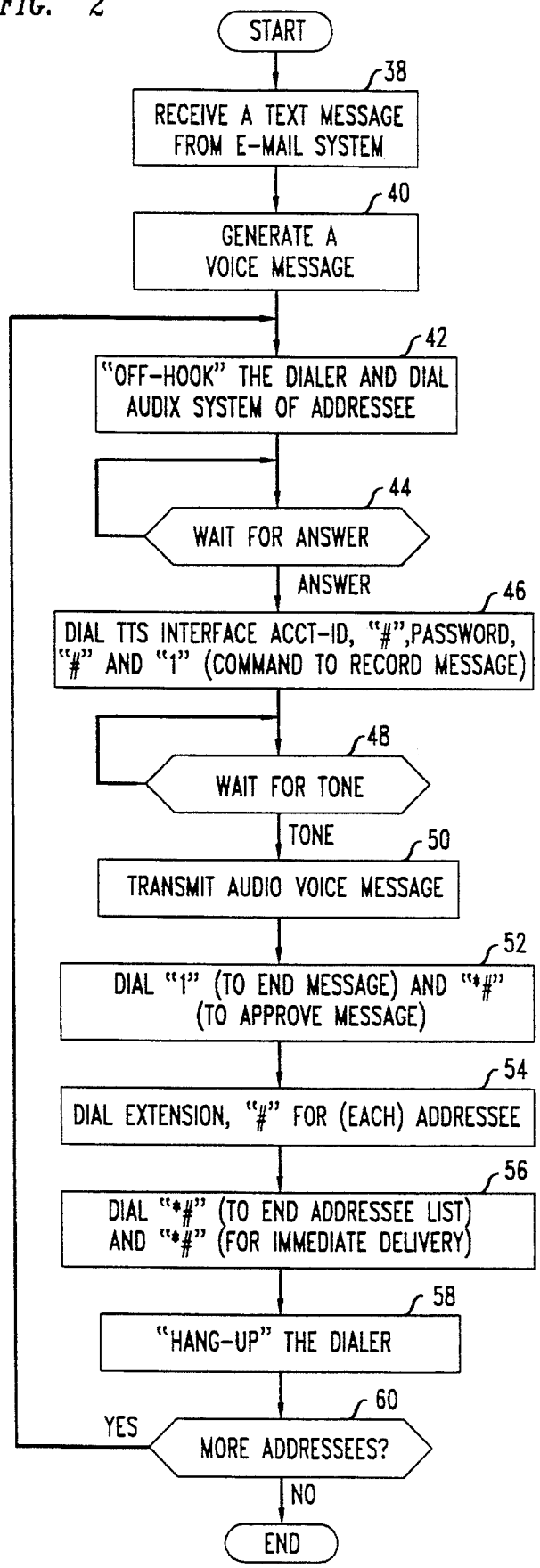
FIG. 2 is a flow diagram of an illustrative process for storing a voice message in an AUDIX voice messaging system in accordance with one embodiment of the present invention.

FIG. 2 is a flow diagram illustrating a process of storing a voice message in an AUDIX voice messaging system in accordance with the operation of the illustrative embodiment of the system of FIG. 1. AUDIX systems typically provide a capability whereby anyone with an AUDIX account (a "registered" user of the given AUDIX system) can directly call the AUDIX system and leave a voice message for anyone else with an account on that AUDIX system. Therefore, in accordance with the illustrative embodiment of FIG. 1, TTS interface 16 is given an AUDIX account for each AUDIX system 30 on which it is empowered to leave voice messages.

The illustrative procedure of FIG. 2 operates as follows. In step 38, TTS interface 16 receives a text message from the e-mail system through network 14. In particular, the e-mail system communicates the text message to TTS interface 16 by addressing the message to the unique address for the TTS interface node. As illustrated in FIG. 1, the node address of TTS interface 16 is "T."

Step 40 of the illustrative procedure of FIG. 2 uses conventional text-to-speech conversion procedures (stored, for example, in memory 20) to produce a voice message for eventual transmission to and storage in a voice messaging system (AUDIX). The audible voice message which is produced is temporarily stored in memory 20 pending its communication to the appropriate AUDIX system in step 50, below. The audio message may be stored in either a compressed or an uncompressed format. In the former case, conventional speech compression techniques may be used to reduce memory storage requirements. These techniques are embodied, for example, as software stored in memory 20 and executed by processor 18.

Once the voice message has been generated, the procedure of FIG. 2 continues by generating the necessary AUDIX access signals and transmitting these signals and the voice message over telephone network 26 via dialer 22. Specifically, step 42 first activates the dialer, making the necessary electrical connection so as to receive a dial tone from the telephone network. Then dialer 22 "dials" the telephone number of the AUDIX system of the intended voice message recipient. (Dialing is performed by transmitting conventional DTMF "touch-tone" audio signals.) This AUDIX system telephone number may, for example, be determined by a lookup in database 24 as described above.

Decision 44 then waits for the AUDIX system to answer the telephone call. This determination may be made by the use of conventional voiced speech recognition techniques (to recognize the presence of AUDIX's introductory spoken message) in combination with conventional audio tone recognition techniques (to ensure that the telephone ringing has terminated). In addition, dialer 22 may "time-out" if the call is not answered within a predetermined amount of time.

Once the call has been answered by the AUDIX system 30, the AUDIX system 30 expects the caller to provide an account number and a corresponding password to authorize access to the system. Therefore, step 46 causes dialer 22 to dial the pre-assigned account number of TTS interface 16 for that particular AUDIX system, followed by "#" (the pound sign key). Recall that TTS interface 16 advantageously maintains an account on each AUDIX system which includes a potential voice message recipient as a user. Next, the dialer dials the pre-assigned password for TTS interface 16 which has also been pre-established for secured access to the AUDIX account, followed by "#." Finally, dialer 22 dials the digit "1." At this point in the call, the digit "1" acts as a command to the AUDIX system to record a voice message.

Note that, in general, it is not necessary for the user of an automated voice response system such as AUDIX to wait for the instructions provided to the caller to complete or even to begin. Since the sequence of requests from the system can be predicted (based on the corresponding sequence of responses which may be known by the caller), the responses may generally be dialed in immediate succession after the answer is detected at step 44. An exception to this general rule is in the recording of the audio voice message. Here, TTS interface 16 must wait for an indication from the AUDIX system that it is ready to accept (i.e., record) the voice message. Accordingly, decision 48 waits for a tone of a well-defined frequency to be transmitted by the AUDIX system. TTS interface 16 may recognize the tone as received through dialer 22 by the use of conventional audio tone recognition techniques. Such techniques may be embodied as software stored in memory 20 and executed by processor 18.

Once the tone has been received from AUDIX system 30, step 50 transmits the audio voice message which was generated in step 40. The voice message is retrieved from memory 20. If the message was stored in a compressed format, conventional speech decompression techniques may be used to restore the originally generated voice message. Such decompression techniques are embodied as software stored in memory 20 and executed by processor 18.

Step 52 causes dialer 22 to dial the digit "1." At this point in the call, the digit "1" acts as a command to AUDIX system 30 to terminate the recording of the voice message. Dialer 22 then dials "*#" (the star key followed by the pound sign key). At this point in the call, these two keys in succession indicate to the AUDIX system that the voice message as sent is approved for storage. (For the benefit of the typical human user, AUDIX allows the recorded message to be played back and edited before approval.)

Step 54 then causes dialer 22 to dial the telephone extension of the intended voice message recipient, followed by "#." (Recall that the extension of an AUDIX user is typically equivalent to that user's account number.) The extension may, for example, be determined by a lookup in database 24 as described above. If the voice message is to be delivered to more than one recipient with an account on the given AUDIX system, multiple extensions, each followed by "#" may be dialed in succession.

Step 56 then causes dialer 22 to dial "*#" followed by another "*#". The first "*#" acts as an indication to AUDIX system 30 that the list of intended recipients for the recorded voice message has been completed. The second "*#" acts as a command to request immediate delivery of the recorded message to each of the recipients whose extensions were entered in step 54. Alternatively, voice messages may be delivered at later, predetermined times by invoking the AUDIX capability for delayed message delivery.

Step 58 electrically disconnects dialer 22 from telephone network 26 to "hang-up" the connection, thereby finishing the call to that particular AUDIX system 30. Decision 60 then determines whether there are additional intended recipients of the voice message on other AUDIX systems. If there are additional recipients (i.e., the intended recipients are not all on the same AUDIX system 30), the procedure of FIG. 2 repeats, starting at step 42, to call another AUDIX system and to store the voice message therein.

Alternative Embodiments

In some conventional computer network configurations, multiple, independent networks may connect systems in such a manner that not all systems are directly connected to all other systems. In such a case, e-mail messages may be indirectly routed through a series of nodes as necessary to reach the node on which the intended recipient's mailbox resides. Thus, in an alternative embodiment of the present invention which includes such a conventional, multiple network e-mail environment, network 14 may be representative of a plurality of independent networks, each reachable from the others through conventional indirect e-mail routing techniques.

In another alternative embodiment, there may be a plurality of TTS interfaces 16 connected to network 14. It may be advantageous to have multiple TTS interfaces merely to handle the potential volume of messages. It may also be advantageous that certain voice message recipients be communicated with only through particular TTS interfaces. Thus, when the e-mail system of such an embodiment sends a text message for conversion into a voice message and storage in a voice messaging system, it may be advantageous that the e-mail system addresses the text message to a particular TTS interface 16.

Moreover, this selected TTS interface node may be determined, for example, by a database lookup similar to the one described above in the discussion of database 24 of FIG. 1. In other words, either individual computer systems 12 or, alternatively, network 14, may include one or more database files. Then, when a text message is to be converted to a voice message, the address of a selected TTS interface node may be determined by a database lookup. This lookup may be based on, for example, an address of a particular e-mail addressee (see the above discussion of database 24). In such an embodiment, database 24 as shown in FIG. 1 may alternatively be connected to network 14, rather than being included in TTS interface 16, as shown. In this manner, the database may be accessible to all systems on the network, and may include not only telephone numbers and extensions, but also node addresses of TTS interfaces 16. These node addresses may be retrieved based on an address of a particular text message addressee.

In an alternative embodiment in which the e-mail system sends the text message to one or more individual text message addressees (i.e., particular users of one or more of computer systems 12), as well as to TTS interface 16, the identity (i.e., text message address) of the sender of the text message is communicated to TTS interface 16. Then, an audible voice message reflecting the sender's identity (e.g., either his or her e-mail address or a corresponding name) may be generated and combined with the voice message generated from the text message.

In another illustrative embodiment, the contents of the text message (i.e., the text itself) are not communicated to TTS interface 16 at all. In this case, only the sender's identity and, possibly, some limited information about the message content (e.g., a message header, which is commonly provided for by e-mail systems), may be sent to TTS interface 16. Then, an audible voice message reflecting the sender's identity and the header may be generated. For example, the message "You have an e-mail message from Fred concerning tomorrow's meeting" may be automatically produced. (Alternatively, such an abbreviated message may be generated even if the full text message is communicated to TTS interface 16.)

In yet another alternative embodiment, the e-mail system may send the text message only to TTS interface 16, but may also specify an individual e-mail addressee (even though the text message is not explicitly sent to that addressee). TTS interface 16 may use database 24 in this case to determine a voice messaging system address corresponding to the specified e-mail addressee in an analogous manner to the embodiments described above.

In still another alternative embodiment, the voice message may be generated "on the fly," eliminating the need for intermediate storage as described in the discussion of step 40 of FIG. 2 above. That is, the message may be generated and transmitted concurrently. In this embodiment, step 40 need not be performed at that point in the procedure. Instead, the generation of the audio voice message may be combined with the performance of step 50. That is, step 50 may both generate and transmit the voice message.

In yet another alternative embodiment, the telephone number dialed may be the "direct" telephone number of an individual, referred to herein as the recipient telephone number. Moreover, there may or may not be a voice messaging system connected to the telephone line. If there is such a system, it will typically answer the call after a predetermined number of rings if the individual fails to answer. In this embodiment, TTS interface 16 may advantageously determine whether a person answers or whether the call is answered by the voice messaging system (e.g., AUDIX or a conventional answering machine). This determination may be made, for example, with the use of conventional speech recognition techniques. In particular, TTS interface 16 may recognize a predetermined "script" as comprised in the prerecorded greetings message of the voice messaging system.

If TTS interface 16 determines that the call has been answered by the voice messaging system, it may wait for the conventional record tone (see discussion of step 48 of FIG. 2 above), and then transmit the generated voice message to the voice messaging system and "hang-up." On the other hand, if it is determined that a person has answered, TTS interface 16 may transmit (i.e., play) the generated audio message directly to the individual (i.e., the person) at the recipient telephone number, rather than storing it in a voice messaging system.

It is to be noted that some text messages may not be fully amenable to text-to-speech conversion. For example, text messages may include non-English language portions such as equations or tables. Thus, in one embodiment, the conventional text-to-speech conversion procedure performed by step 40 of the illustrative embodiment of FIG. 2 recognizes the presence of non-convertible material in the text message. Upon a determination that such material is present, step 40 may, for example, generate speech (as a portion of the voice message) directing the voice message recipient to the corresponding text message (if there is one) for the necessary details. In addition, the text message may be too long for a complete text-to-speech conversion. For example, the resultant voice message may be too long for storage in the voice mailbox or too long as a practical matter to be received in voice form (i.e., excessively long messages may be undesirable in voice form). In this case, step 40 may, for example, limit the text-to-speech conversion to an initial portion of the text message, followed by an indication to the voice message recipient that additional message content has been deleted from the voice version of the message.

Although a number of specific embodiments of this invention have been shown and described herein, it is to be understood that these embodiments are merely illustrative of the many possible specific arrangements which can be devised in application of the principles of the invention. Numerous and varied other arrangements can be devised in accordance with these principles by those of ordinary skill in the art without departing from the spirit and scope of the invention.

I claim:

1. A method of storing a voice message in a voice messaging system, the voice messaging system having a human operator interface associated therewith, the voice message based on a text message from a text messaging system, the text messaging system comprising one or more addressable nodes including a messaging system interface node, the text messaging system and the voice messaging system coupled by a communications network, the method comprising the steps of:

the messaging system interface node receiving the text message from the text messaging system based on an address of the messaging system interface node;

the messaging system interface node generating a voice message responsive to the text message;

the messaging system interface node communicating interface signals over the communications network to access the voice messaging system, the interface signals for simulating human operation of the voice messaging system in accordance with the human operator interface associated therewith; and communicating the voice message over the communications network to the voice messaging system for storage.

2. The method according to claim 1 wherein the communications network comprises a telephone network and the signals comprise telephone access signals.

3. The method according to claim 1 wherein the step of generating a voice message comprises performing text-to-speech conversion on the text message to produce the voice message.

4. The method according to claim 1 further comprising the step of communicating the text message to a text message addressee with use of the text messaging system.

5. The method according to claim 4 wherein the voice message reflects that a text message has been communicated with use of the text messaging system.

6. The method according to claim 1 further comprising the step of determining a voice messaging system address of a voice message addressee based on a text messaging system address, and wherein the step of communicating signals to access the voice messaging system comprises communicating said voice messaging system address.

7. The method according to claim 6 wherein the voice messaging system address of the voice message addressee comprises a telephone number.

8. The method according to claim 6 wherein the voice messaging system address of the voice message addressee comprises a telephone extension.

9. The method according to claim 1 further comprising the step of determining the address of the messaging system interface node based on a text messaging system address of a text message addressee.

10. A messaging system interface node for use in storing a voice message in a voice messaging system, the voice messaging system having a human operator interface associated therewith, the voice message based on a text message from a text messaging system, the text messaging system comprising one or more addressable nodes including the messaging system interface node, the text messaging system and the voice messaging system coupled by a communications network, the messaging system interface node comprising:

means for receiving the text message from the text messaging system based on an address of the messaging system interface node;

means for generating a voice message responsive to the text message;

means for generating interface signals and communicating said interface signals over the communications network to access the voice messaging system, the interface signals for simulating human operation of the voice messaging system in accordance with the human operator interface associated therewith; and means for communicating the voice message over the communications network to the voice messaging system for storage.

11. The messaging system interface node according to claim 10 wherein the communications network comprises a telephone network.

12. The messaging system interface node according to claim 10 wherein the means for generating a voice message comprises means for performing text-to-speech conversion on the text message to produce the voice message.

13. The messaging system interface node according to claim 10 further comprising means for determining a voice messaging system address for an voice message addressee based on a text messaging system address.

14. A method of communicating a voice message to a voice messaging system, the voice messaging system having a human operator interface associated therewith, the voice message based on a text message from a text messaging system, the text messaging system comprising one or more addressable nodes including a messaging system interface node, the text messaging system and the voice messaging system coupled by a telephone network, the method comprising the steps of:

the messaging system interface node receiving the text message from the text messaging system based on an address of the messaging system interface node;

the messaging system interface node generating interface signals for simulating human operation of the voice messaging system in accordance with the human operator interface associated therewith;

the messaging system interface node generating a voice message responsive to the text message; and transmitting the interface signals and the voice message over the telephone network based on a recipient telephone number.

15. The method according to claim 14 wherein the step of transmitting the voice message comprises transmitting the voice message to a person.

16. The method according to claim 14 wherein the step of generating a voice message comprises performing text-to-speech conversion on the text message to produce the voice message.

17. The method according to claim 14 further comprising the step of communicating the text message to a text message addressee with use of the text messaging system.

18. The method according to claim 17 wherein the voice message reflects that a text message has been communicated with use of the text messaging system.

19. The method according to claim 14 further comprising the step of determining the recipient telephone number based on a text messaging system address.

20. The method according to claim 14 further comprising the step of determining the address of the messaging system interface node based on a text messaging system address of a text message addressee.

21. A messaging system interface node for use in communicating a voice message to a voice messaging system, the voice messaging system having a human operator interface associated therewith, the voice message based on a text message from a text messaging system, the text messaging system comprising one or more addressable nodes including the messaging system interface node, the text messaging system and the voice messaging system coupled by a telephone network, the messaging system interface node comprising:

means for receiving the text message from the text messaging system based on an address of the messaging system interface node;

means for generating interface signals for simulating human operation of the voice messaging system in accordance with the human operator interface associated therewith;

means for generating the voice message responsive to the text message; and means for transmitting the interface signals and the voice message over the telephone network based on a recipient telephone number to the voice messaging system.

22. The messaging system interface node according to claim 21 wherein the means for generating a voice message comprises means for performing text-to-speech conversion on the text message to produce the voice message.

23. The messaging system interface node according to claim 21 further comprising means for determining the recipient telephone number based on a text messaging system address.

* * * * *